United States Patent [19]

Bono et al.

[11] Patent Number: 5,321,065

[45] Date of Patent: Jun. 14, 1994

[54] DEGRADABLE PLASTICS FILM INCLUDING LIGNIN AS ACTIVE VEGETABLE FILLER

[76] Inventors: Pierre Bono, 34 rue Alphonse Daudet, Challans 85300, France; Claude Lambert, 16 allacu/e/ e des Thuyas, St. Michel Sur Orge 91240, France

[21] Appl. No.: 867,718

[22] PCT Filed: Jan. 22, 1991

[86] PCT No.: PCT/FR91/00034

§ 371 Date: Jul. 9, 1992

§ 102(e) Date: Jul. 9, 1992

[87] PCT Pub. No.: WO91/11481

PCT Pub. Date: Aug. 8, 1991

[30] Foreign Application Priority Data

Jan. 23, 1990 [FR] France ............................. 9000965

[51] Int. Cl.$^5$ .................. C08L 97/00; C08L 97/02
[52] U.S. Cl. ............................ 524/76; 428/220; 435/262; 523/124; 523/126; 523/128; 524/9; 524/13; 524/27; 524/72

[58] Field of Search .................. 435/262; 524/72, 76, 524/81, 13; 523/126, 128, 124; 428/220

[56] References Cited

U.S. PATENT DOCUMENTS

| 3,454,510 | 7/1969 | Newland | 523/126 |
| 4,165,302 | 8/1979 | Armenti | 524/13 |
| 4,559,376 | 12/1985 | Kubåt | 524/13 |
| 4,705,816 | 11/1987 | Pole | 523/132 |
| 4,818,604 | 4/1989 | Tock | 428/319.9 |
| 4,931,488 | 6/1990 | Chiquet | 523/126 |
| 4,939,194 | 7/1990 | Scott | 524/134 |

*Primary Examiner*—Fred Zitomer
*Attorney, Agent, or Firm*—Paul & Paul

[57] ABSTRACT

A degradable plastic film comprising film forming ethylene copolymers and lignin incorporated in the form of pulverulent powder having a grain diameter of about 1 to 5 microns. The films are homogeneous and possess a thickness of about 15 to 25 microns. The films may be made doubly decomposable by adding photoactive or oxidizing agents.

11 Claims, No Drawings

DEGRADABLE PLASTICS FILM INCLUDING LIGNIN AS ACTIVE VEGETABLE FILLER

FIELD OF THE INVENTION

The invention relates to a degradable plastic film including lignin as active vegetable filler.

BACKGROUND OF THE INVENTION

Photodegradable plastic films have also been known are known and more recently so-called biodegradable plastic films. The photodegradable plastic films are are obtained by introducing photoactive additives into a basic material which can be a polyolefin, for example. Generally, these additives are form by molecules containing oxygen and/or heavy metals the role of which is to initiate the formation of free radicals under the action of ultraviolet (UV) radiation; these radicals cause a rupture of the chains of the polymer and therefore make the polymer fragile, by making it weak and therefore mechanically degradable.

However, the use of certain additives which are strongly oxidizing causes the degradation to start immediately after the manufacture of the films, which has for consequence to reduce the storage capacity either of the master mixtures or of the films.

It should be noted that in agricultural uses of photodegradable films, portions of the films which are buried in the ground are protected from UV radiation and therefore not altered and not mechanically degradable, which has for its consequence to increase the scraps.

With respect to the biodegradable plastic films, they are obtained by the introduction of a so-called biodegradable organic filler such as starch which, consumed by the microorganisms, will make in turn the film fragile and therefore more easily degradable under the influence of the UV radiation.

The addition of starch as a consumable filler for microorganisms has consequences both concerning the fabrication of the film and in its mechanical properties; actually: starch is partially decomposed as soon as a temperature of 180° C. is reached during the extrusion operation used in making the film; starch is not compatible with the polymers and therefore embrittles the films. Finally, the granulometry of the industrially available starch does not permit making films of small thickness. Yet, the thickness is an element of the cost price of the film, but also a parameter which governs the degradation speed of the film.

DETAILED DESCRIPTION OF THE INVENTION

The present invention provides a new plastic film, for example based on ethylene copolymer (generally polyolefins) in which there has been introduced lignin which behaves as an organic biodegradable additive and which is consumed by the microorganisms, without reducing the other characteristics of the product, in particular its mechanical properties. Lignin which is in the form of a powder can result from the processes presently known and used for the manufacture of paper pulps, such as a process as follows known under the following definitions:

A.P.R. (alcohol, pulping and recovery)
Organosolve or any other process for obtaining lignin of a good purity, i.e. not a lignin contaminated by chemical products such as sulphonates, soda, bisulphite ..., and being in the form of pulverulent powder (with a grain diameter of about 1 to 5 microns), which permits making homogeneous films of a small thickness of about $20\pm5$ microns.

Lignin is a polymeric vegetable material made of methoxylated and hydroxylated cores forming a three-dimensional structure. It is a by-product obtained in the manufacture of paper pulp. The vegetable origin of lignin classifies it in the category of renewable products and, since it does not spoil the earth natural resources, lignin can be considered as an ecoproduct.

Due to the excellent compatibility of lignin with the ethylenic copolymers, the weight contents of lignin in the thermo-plastic polymer of the degradable plastic film, can be as high as 75% but will be preferably adjusted between 3 and 25%, which implies the use of master mixtures.

The combination of the photodegradable, biodegradable and oxidizing properties of lignin can be advantageously used here for obtaining a degradable film. Actually, lignin which is a vegetable material, biodegradable by mushrooms (micromycetes) and bacteria, contributes under certain conditions to the embrittlement of the plastic film.

If measures are taken to add photoactive and/or oxidizing additives (such as a pro-oxidizer to the master mixture, a degradable film will be made according to two processes:

one being a chemical process, for example: photodegradation or oxidization, or a combination of the photodegradable and oxidation processes the other being a biological proceed one of the two processes contributing to initiate the other.

The plastic films thus obtained can be used for many agricultural applications, as well as for the manufacture of plastic bags for refuse, bags for various scraps, shopping baskets, etc.

In the agricultural applications, in which the solidity of the film is essential when it is laid on the ground for the first time, the lignin containing polyethylene film of the present invention appears particularly interesting to use since the degradation of the film over time is total, both for the surfaces which are outside the ground and for those which are buried inside the ground; still in the agricultural applications field, the adsorption and absorption capacities of lignin, up to 50% by weight, of essential oils, insecticides land the like, will permit then a use of lignin as an additive for the new fungicidal, rat-killing or other properties.

Likewise, the adsorption properties of lignin can be utilized so that the lignin can be incorporated into the photoactive products prior to its mixture with the copolymers, which has the advantage of increasing the homogeneity and therefore the degradability of the film. On the other hand, this lignin containing plastic film can be coextruded, and can therefore be a part of a composite film with several specific layers.

It should further be noted that the mechanical properties of the lignin containing degradable film of the present invention are comparable to those of a now film which does not contain any lignin acutally.

Raw film:
    tear strength 25 MPa
    breaking elongation 220%
Film with 5% of lignin:

tear strength 25.5 MPa
breading elongation 230%.

We claim:

1. A degradable plastic film comprising film forming ethylene copolymers and containing lignin, wherein said lignin has been incorporated in the form of pulverulent powder having a grain diameter of between about 1 and 5 microns, such that said films are homogenous and possess a thickness of between about 15 to about 25 microns.

2. A degradable plastic film as set forth in claim 1, wherein said ethylene copolymers comprise polyolefins.

3. A degradable plastic film as set forth in claim 1, wherein the film further comprises photoactive additives.

4. A degradable plastic film as set forth in claim 1, wherein the film further comprises oxidizing additives.

5. A degradable plastic film as set forth in claim 4, wherein said oxidizing additives comprises a pro-oxidizer.

6. A degradable plastic film as set forth in claim 1 comprising a lignin content of from about 3.0% to about 75%.

7. A degradable plastic film as set forth in claim 6, comprising a lignin content between 3 and 25%.

8. A degradable plastic film as set forth in claim 1, wherein said film has a lignin content of 5% and exhibits a tear strength of 25.5 MPa and a breaking elongation of 230%.

9. A degradable plastic film as set forth in claim 1, further comprising fungicidal additives.

10. A degradable plastic film as set forth in claim 1, further comprising rat-killing additives.

11. A degradable plastic film as set forth in claim 1, wherein the film is coextruded in order to form a film of a composite structure.

* * * * *

UNITED STATES PATENT AND TRADEMARK OFFICE
CERTIFICATE OF CORRECTION

PATENT NO. : 5,321,065
DATED : June 14, 1994
INVENTOR(S) : Pierre Bono, Claude Lambert It is certified that error appears in the above-indentified patent and that said Letters Patent is hereby corrected as shown below:

```
Col.  line 1, delete --have also been known--
      line 3, after films insert have also been known
              delete --are-- second occurence insert therefore comprised of
      line 27, after "should" insert also
      line 28, after "of" delete --the-- consequence to--
Col. 2, line 28, after "pro-oxidizer" add a )
        line 33, delete --proceed-- and insert therefore
                process
        line, 63, after "a" delete --now-- and insert
                  therefore raw.
```

Signed and Sealed this

Twenty-fifth Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,321,065
DATED      : June 14, 1994
INVENTOR(S): Pierre Bono, Claude Lambert It is certified that error appears in the above-indentified patent and that said Letters Patent is hereby corrected as shown below:

On title page, item

[76] Inventors: CLAUDE LAMBERT 16 Allee des Thuyas, St. Michel Sur Orge, 91240, France Col. 1, line 11, delete --have also been known--
line 13, after "films" insert --have also been known--
delete --are-- second occurrence.

Col. 3, line 2, delete "breading" and insert therefore <u>breaking</u>.

Signed and Sealed this

Tenth Day of January, 1995

Attest:

BRUCE LEHMAN

Attesting Officer

Commissioner of Patents and Trademarks